(12) United States Patent
Braun et al.

(10) Patent No.: US 6,886,859 B2
(45) Date of Patent: May 3, 2005

(54) CLAMPING MECHANISM FOR AN ADJUSTABLE STEERING COLUMN

(75) Inventors: Markus Braun, Cologne (DE); Axel Hebenstreit, Stuttgart (DE); Karl-Heinz Knoll, Weinstadt (DE)

(73) Assignee: DaimlerChrysler AG, Stuttgart (DE)

( * ) Notice: Subject to any disclaimer, the term of this patent is extended or adjusted under 35 U.S.C. 154(b) by 62 days.

(21) Appl. No.: 10/279,314

(22) Filed: Oct. 24, 2002

(65) Prior Publication Data

US 2003/0103805 A1 Jun. 5, 2003

(30) Foreign Application Priority Data

Oct. 25, 2001 (DE) .......................................... 101 52 807

(51) Int. Cl.[7] .............................................. B60R 1/181
(52) U.S. Cl. .......................................... 280/775; 74/493
(58) Field of Search .......................... 280/775; 74/493; B62D 1/181, 1/189, 1/185, 1/187

(56) References Cited

U.S. PATENT DOCUMENTS 6,237,438 B1 * 5/2001 Ben Rhouma et al. ....... 74/492

6,290,258 B1   9/2001 Parkinson et al.

FOREIGN PATENT DOCUMENTS

| DE | 198 27 464 |   | 1/1999 |
| DE | 100 25 979 |   | 12/2000 |
| DE | 010240267 C1 | * | 11/2003 |
| FR | 2 687 628 |   | 8/1993 |
| GB | 2 327 257 |   | 1/1999 |
| WO | 00/37298 |   | 6/2000 |
| WO | 01/28710 |   | 4/2001 |

* cited by examiner

Primary Examiner—Eric Culbreth
(74) Attorney, Agent, or Firm—Kenyon & Kenyon

(57) ABSTRACT

In order to create a clamping mechanism for an adjustable steering column of a motor vehicle, the clamping mechanism is provided with a clamping device and with an electrical actuator, which drives a clamping element that may be moved between a clamped position and an unclamped position. The electrical actuator is fixed to a support mounting, which may be compactly arranged on the steering column, in proximity to the clamping device, and the support mounting of the actuator may be integrally formed with a component of the clamping element.

16 Claims, 2 Drawing Sheets

CLAMPING MECHANISM FOR AN ADJUSTABLE STEERING COLUMN

CROSS-REFERENCE TO RELATED APPLICATIONS

The present application claims priority to Application No. 101 52 807.8, filed in the Federal Republic of Germany on Oct. 25, 2001, which is expressly incorporated herein in its entirety by reference thereto.

FIELD OF THE INVENTION

The present invention relates to a clamping mechanism for an adjustable steering column.

BACKGROUND INFORMATION

German Published Patent Application No. 198 27 464 describes a clamping mechanism, which can be activated by means of an electrical actuator. The clamping mechanism fixes the steering column in a specific position selected by the driver. A clamping element that can be actuated by an electrical actuator holds the clamping mechanism in a clamped position. Activation by the driver of the electrical actuator brings the clamping element into an unclamped position, so that the clamping mechanism is rendered inoperative and the steering column can thereby be moved relative to the mounting fixed to the vehicle.

In order to cancel the steering column clamping mechanism, the driver presses an operating button, which activates an electric motor. The motor drives the clamping element, which is thereby brought into the unclamped position. The clamping action is canceled.

The number of components makes manufacturing of the convenient clamping mechanism described in German Published Patent Application No. 198 27 464 relatively demanding. Moreover, the motor used means that such arrangements take up more overall space, which is not always available, particularly in the driving controls area where the steering column is mounted.

An object of the present invention is to provide a clamping mechanism for an adjustable steering column having an electrical actuator, which is arranged compactly on the steering column.

SUMMARY

The above and other beneficial objects of the present invention are achieved by providing a clamping mechanism as described herein.

By forming the actuator support mounting integrally with a component of a clamping element, which generates the necessary clamping force, the electrical actuator may be arranged directly on the clamping element so that transmission or gear elements may be omitted. Reducing the number of components makes it possible to simplify the production process. Moreover the support mounting may be used, together with the component of the clamping element, as module carrier, so that all major assembly work can be prefabricated.

In one example embodiment of the present invention, the clamping device may be formed by two laminated plate assemblies, of which the first laminated plate assembly is assigned to a bracket fixed to the vehicle and the second laminated plate assembly to a casing tube, moveable in relation to the bracket. The steering column is secured in its normal position by reciprocal bracing of the laminated plate assemblies.

According to one example embodiment of the present invention, the laminated plate assemblies may be braced by a clamping bolt, which passes both through the laminated plate assemblies and through the clamping element.

A simple method of bracing may be achieved in that the clamping element takes the form of two clamping plates rotatable in opposition to one another. By the rotation, the section on the clamping bolt occupied by the clamping plates may be reduced or expanded. One clamping plate may be driven by the electrical actuator, in order to achieve the rotation.

In one example embodiment of the present invention, the clamping plate that is not driven by the electrical actuator may be the component of the clamping element, which is integrally formed with the support mounting. This makes it possible, for example, to dispense with guide devices that may otherwise be needed in order to carry the electrical actuator along during tilting or displacement of the steering column.

For a cost-effective configuration, the electrical actuator may be an electric motor which provides the translatory drive for a shaft.

By an eye at the free end of the shaft, the electric motor may be easily coupled to the driven clamping element.

For this purpose the driven clamping plate may have a pin, which projects from the clamping plate parallel to the extent of the clamping bolt and is surrounded by the eye.

In order to achieve a defined rotation of the clamping plates in relation to one another, a sliding gate guide may be provided, which defines the limit positions of the first clamping plate in relation to the second clamping plate.

The clamping position of the clamping element may be defined by providing the clamping plates with elevations and depressions on their opposing inner sides. Superimposing the elevations of the clamping plates on one another produces clamping, whereas if the elevations of the first clamping plate are in the corresponding depressions of the second clamping plate, or vice-versa, the clamping is canceled.

An exemplary embodiment of the invention will be explained below with reference to the drawings.

DETAILED DESCRIPTION

Figure 1:
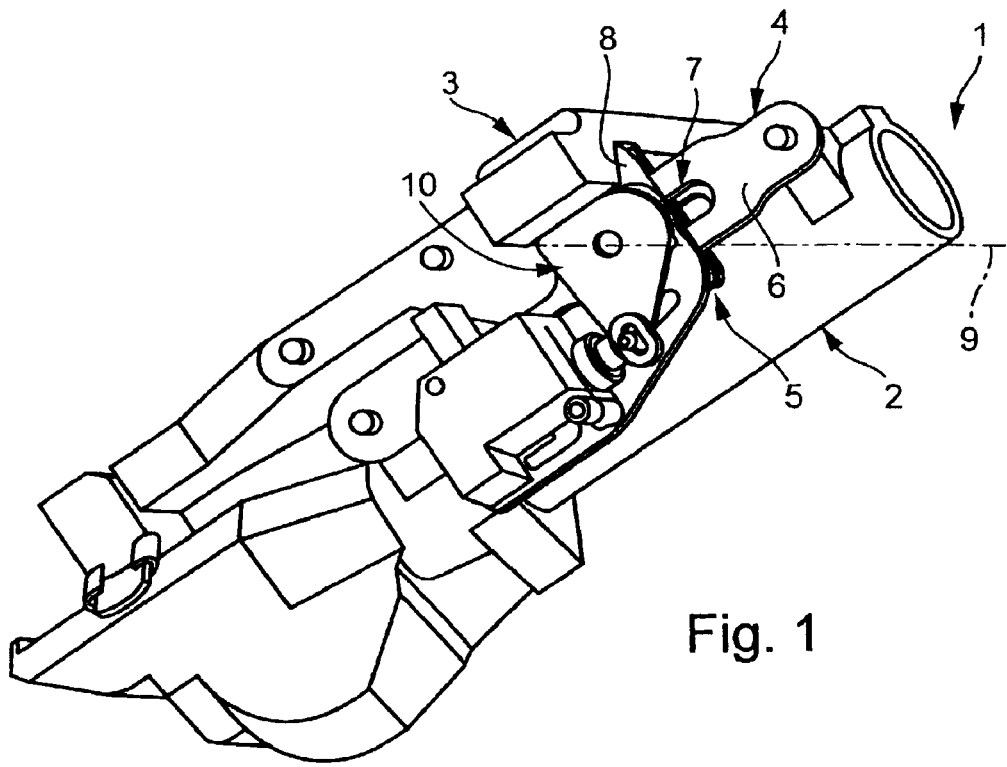
FIG. 1 is a perspective partial view of a steering column having an actuator for a clamping mechanism.

FIG. 1 illustrates a steering column 1 having a casing tube 2, which tube is supported so that it is moveable relative to a bracket 3 fixed to the vehicle. This support is provided by a laminated plate assembly 4 assigned to the casing tube 2 together with a laminated plate assembly 5 assigned to the bracket 3, plates 6 and 8 of the laminated plate assemblies 4 and 5 being arranged alternately to one another. Each plate 6 of the laminated plate assembly 4 has an elongated hole 7 aligned approximately parallel to the longitudinal axis of the steering column 1, whereas each plate 8 of the laminated plate assembly 5 has an elongated hole extending approximately at right-angles to the longitudinal axis of the steering column 1, the hole being arranged so that it is concealed and therefore not visible. Where the elongated holes of the plates 6 and 8 cross, a clamping bolt 9 (indicated by a dot-and-dash line) passes through the plates 6 and 8 of the laminated plate assemblies 4 and 5 and a part of the casing tube 2.

Figure 2:
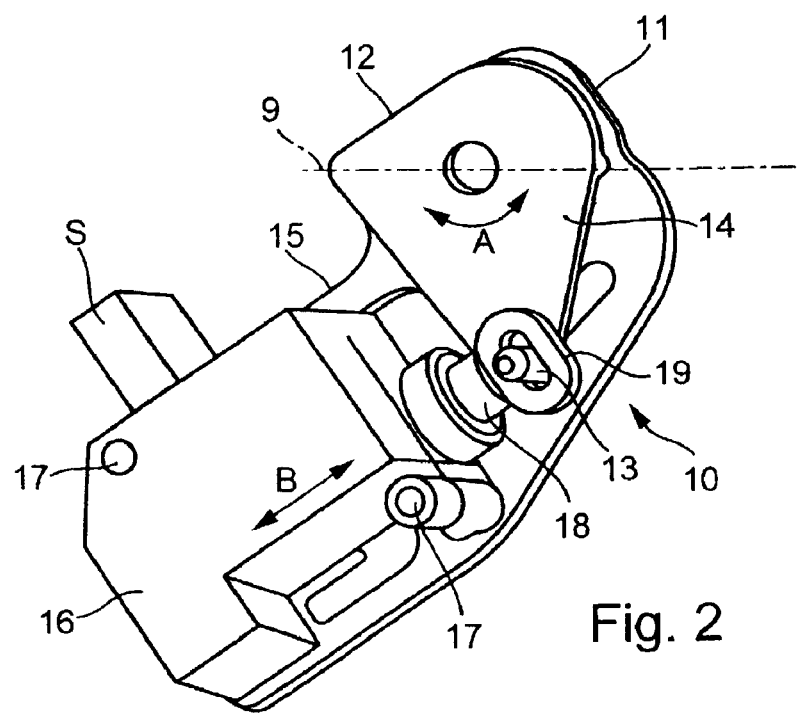
FIG. 2 is a detailed representation of the actuator illustrated in FIG. 1.

In addition to laminated plate assemblies 4 and 5, a clamping element 10, which is illustrated in detail in FIG. 2, is arranged on the clamping bolt 9. The clamping element 10 includes two clamping plates 11 and 12. The clamping plate 12 is supported so that it may rotate in relation to the clamping plate 11 as indicated by arrow A. For the introduction of force or driving the clamping plate 12, the latter has a pin 13, which projects from the outer side 14 of the clamping plate 12 approximately parallel to the clamping bolt 9.

The clamping plate 11 is integrally formed with a support mounting 15 for an electric motor 16. The electric motor 16 is fixed to the support mounting 15 by fasteners 17. The electric motor 16 has a connection fitting S for the electrical connection. A shaft 18, which when the electric motor is actuated performs a translatory movement as indicated by arrow B, emerges from a side wall of the electric motor 16. Fixed to the free end of the shaft 18 is an eye 19, in which the pin 13 of the clamping plate 12 is supported.

At the movement of the shaft 18 indicated by arrow B, the clamping plate 12, carried by the pin 13, is displaced around the clamping bolt 9 as indicated by arrow A.

Figure 3:
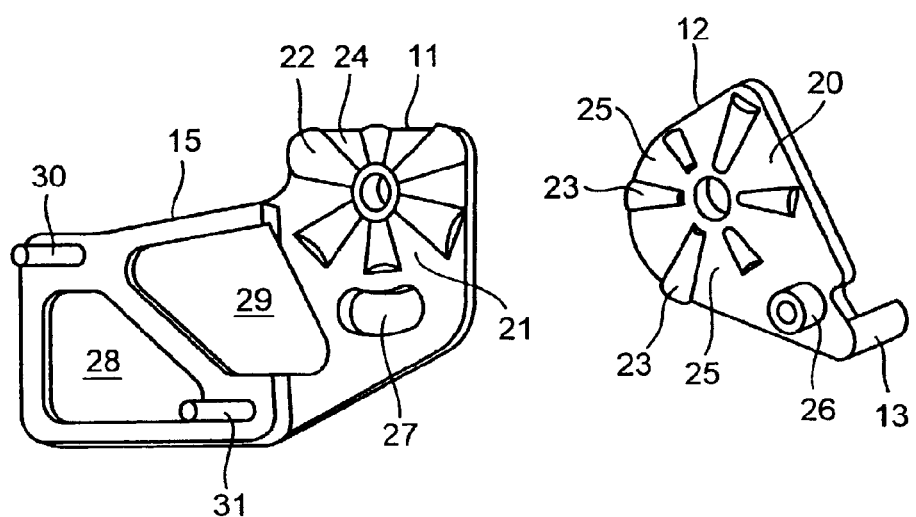
FIG. 3 is a detailed representation of a support mounting for the actuator illustrated in FIG. 1.

As may be seen from FIG. 3, each of the clamping plates 11 and 12 has elevations 22 and 23 and depressions 24 and 25 on their opposing inner sides 20 and 21 respectively. Depending on the angle of rotation of the two clamping plates 11 and 12 in relation to one another, either the elevations 22 and 23 are superimposed on one another, or the elevations 22 or 23 are in the corresponding depressions 25 or 24. If the elevations 22 and 23 are superimposed on one another, the casing tube 2 is clamped. If the elevations 22 or 23 are in the depressions 25 or 24, the clamping is canceled. A guide block 26, which projects from the inner side 20 of the clamping plate 12 and is guided in a guide 27 let into the clamping plate 11, allows the clamping plate 12 to assume two limit positions.

The clamping plate 11 is integrally formed with the support mounting 15. To save weight, the approximately rectangular support mounting 15 has triangular openings 28 and 29. The retaining pins 30 and 31 projecting from the support mounting 15 serve to receive the electric motor 16, the latter being fixed to the pins by a suitable arrangement.

The operating principle of the invention is described below with reference to FIGS. 1 to 3.

In operation of the vehicle, the casing tube 2 is clamped as illustrated in FIG. 1. The shaft 18 is situated in the left-hand dead point position, that is, it is fully run in. The clamping plate 12 is fixed in the limit position, in which its elevations 23 are superimposed on the elevations 22 of the second clamping plate 11. The laminated plate assemblies 4 and 5 are therefore compressed on the clamping bolt 9.

For comfort adjustment of the steering column 1, the driver presses a button or throws a switch, e.g., thereby actuating the electric motor 16. The shaft 18 is moved from its left-hand dead point into its right-hand dead point as indicated by arrow B, that is, it is run out. The eye 19 thereby carries the pin 13 of the clamping plate 12, so that this is displaced about the axis of the clamping bolt 9, as indicated by arrow A. This rotation brings the clamping plate 12 to be with its elevations 23 in the depressions 24 of the clamping plate 11, that is, the section of the clamping element 10 occupied on the clamping bolt 9 is reduced. As a result the plates 6 and 8 of the laminated plate assemblies 4 and 5 are disengaged. The clamping of the casing tube 2 is canceled.

The driver may now manually push the steering wheel in or pull it out, or tilt it upwardly or downwardly, the maximum displacement travels being dependent upon the elongated holes in the plates 6 and 8.

This may provide a comfortable adjustment for the steering column of a motor vehicle, in which the clamping of the casing tube is canceled "at the touch of a button," whereas the steering wheel may be conveniently set to the desired position.

What is claimed is:

1. A clamping mechanism for an adjustable steering column of a motor vehicle, comprising:
   a clamping device configured to release and clamp the steering column arranged at a specific position; and
   an electrical actuator configured to drive a clamping element movable between a clamped position and an unclamped position, the electrical actuator fixed to a support mounting in proximity to the clamping device, the support mounting integrally formed with a component of the clamping element.

2. The clamping mechanism according to claim 1, wherein the clamping device includes two laminated plate assemblies, a first laminated plate assembly assigned to a bracket fixed to the motor vehicle, a second laminated plate assembly assigned to a casing tube movable relative to the bracket.

3. The clamping mechanism according to claim 2, further comprising a clamping bolt arranged to pass through the laminated plate assemblies and through the clamping element.

4. The clamping mechanism according to claim 2, wherein each plate of the first laminated plate assembly includes an elongated hole aligned essentially parallel to a longitudinal axis of the steering column.

5. The clamping mechanism according to claim 2, wherein each plate of the second laminated plate assembly includes an elongated hole extending essentially at right angles to a longitudinal axis of the steering column.

6. The clamping mechanism according to claim 1, wherein the clamping element includes two clamping plates rotatable in opposition to one another, one of the clamping plates arranged to be driven by the electrical actuator.

7. The clamping mechanism according to claim 6, wherein the component of the clamping element integrally formed with the support mounting includes a non-driven clamping plate.

8. The clamping mechanism according to claim 1, wherein the electrical actuator includes an electric motor configured to provide translatory drive to a shaft.

9. The clamping mechanism according to claim 8, wherein the shaft includes an eye at a free end.

10. The clamping mechanism according to claim 9, wherein the eye is configured to support a pin that projects from a clamping plate of the clamping element that is driven by the electric motor.

11. The clamping mechanism according to claim 1, wherein the support mounting is essentially rectangular.

12. The clamping mechanism according to claim 1, wherein the support mounting includes at least one opening.

13. A clamping mechanism for an adjustable steering column of a motor vehicle, comprising:
   a clamping device configured to release and clamp the steering column arranged at a specific position;
   an electrical actuator configured to drive a clamping element movable between a clamped position and an unclamped position, the electrical actuator fixed to a support mounting in proximity to the clamping device, the support mounting integrally formed with a component of the clamping element, the clamping element including two clamping plates rotatable in opposition to one another, one of the clamping plates arranged to be driven by the electrical actuator; and a sliding gate guide configured to define a limit position of a first clamping plate of the two clamping plates in relation to a second clamping plate of the two clamping plates.

14. The clamping mechanism according to claim 13, wherein the electrical actuator is configured to drive the second clamping plate.

15. A clamping mechanism for an adjustable steering column of a motor vehicle, comprising:

a clamping device configured to release and clamp the steering column arranged at a specific position; and an electrical actuator configured to drive a clamping element movable between a clamped position and an unclamped position, the electrical actuator fixed to a support mounting in proximity to the clamping device, the support mounting integrally formed with a component of the clamping element;

wherein the clamping element includes two clamping plates rotatable in opposition to one another, one of the clamping plates arranged to be driven by the electrical actuator; and wherein the clamping plates include elevations and depressions on opposing inner sides, the elevations superimposed on one another in a first limit position, the elevations of a first clamping plate arranged in a corresponding depression of a second clamping plate in a second limit position.

16. The clamping mechanism according to claim 15, wherein the electrical actuator is configured to drive the second clamping plate.

* * * * *